Figure 1:
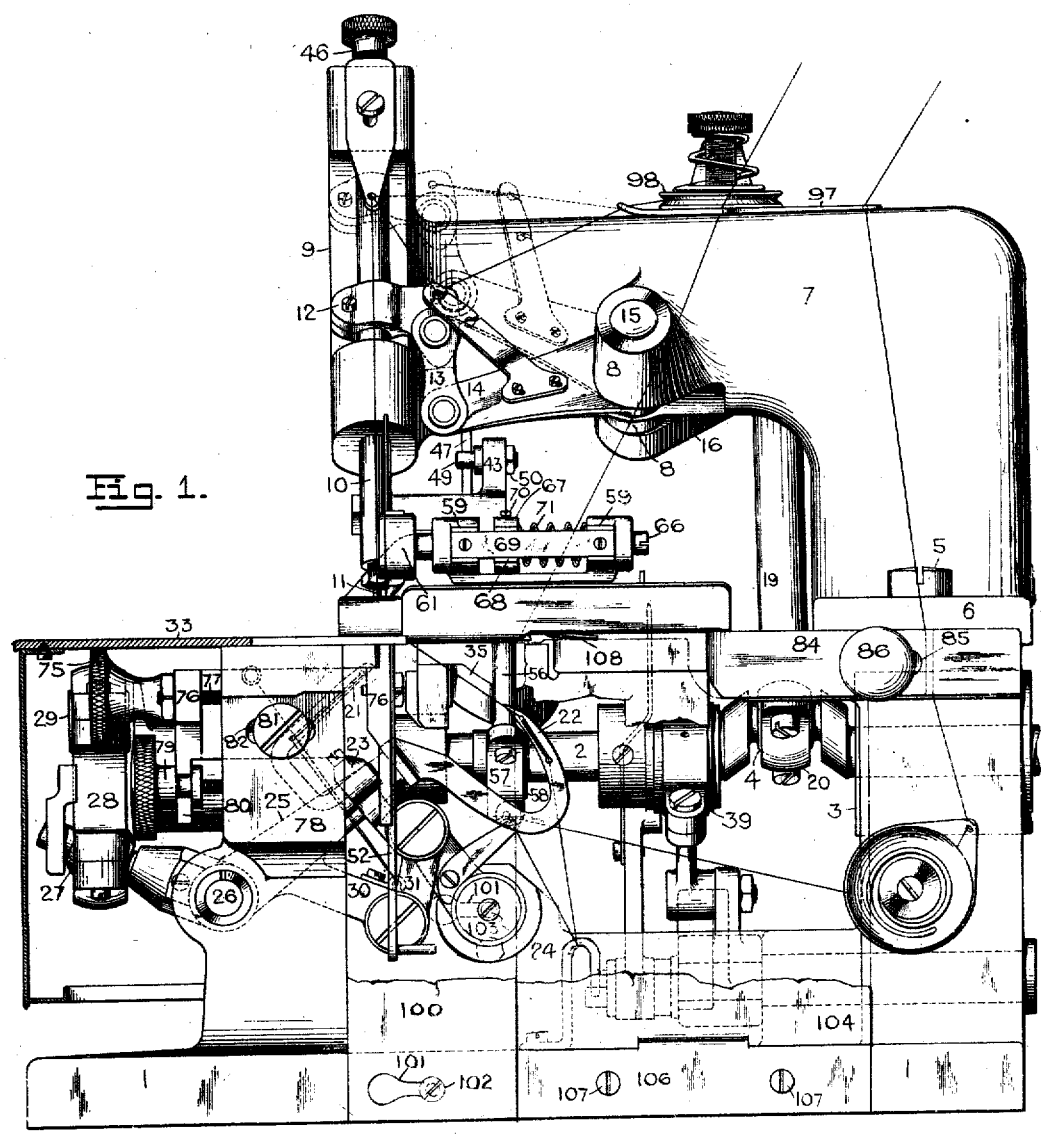

A. GRIEB.
TRIMMING MECHANISM FOR SEWING MACHINES.
APPLICATION FILED APR. 25, 1908.

933,033.

Patented Aug. 31, 1909.

3 SHEETS—SHEET 1.

WITNESSES:

INVENTOR.
Alfred Grieb,
BY
ATTORNEY.

A. GRIEB.
TRIMMING MECHANISM FOR SEWING MACHINES.
APPLICATION FILED APR. 25, 1908.
933,033.
Patented Aug. 31, 1909.
3 SHEETS—SHEET 2.
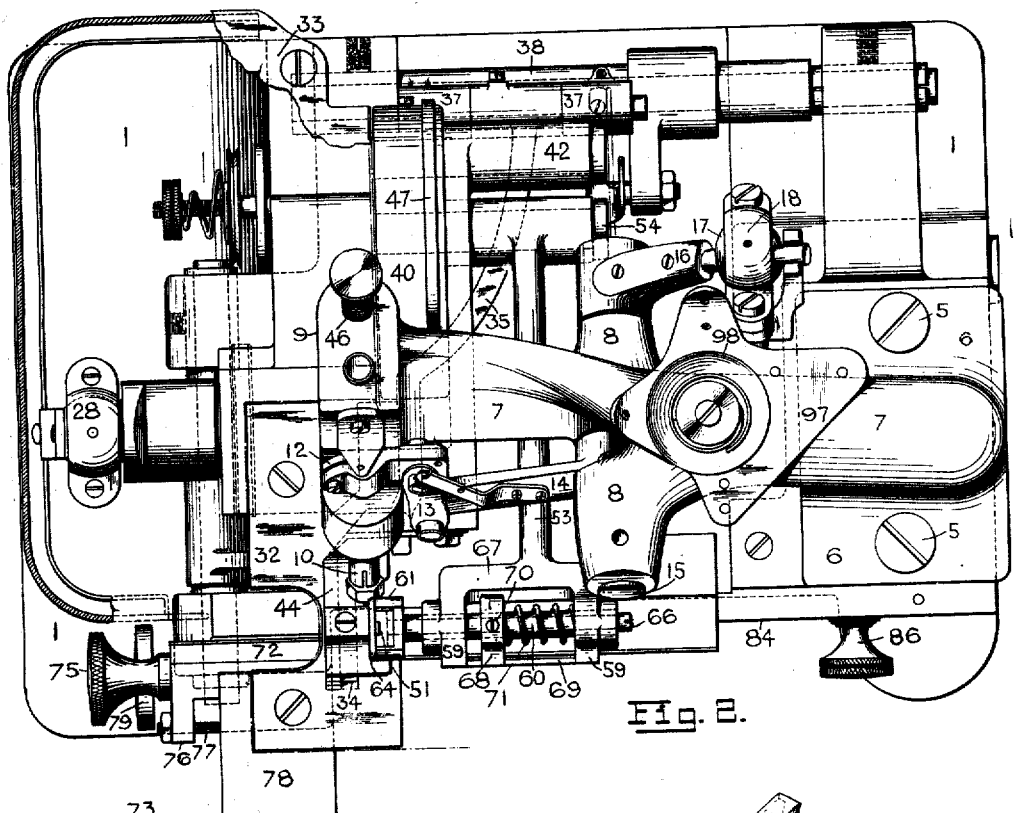
Fig. 2.
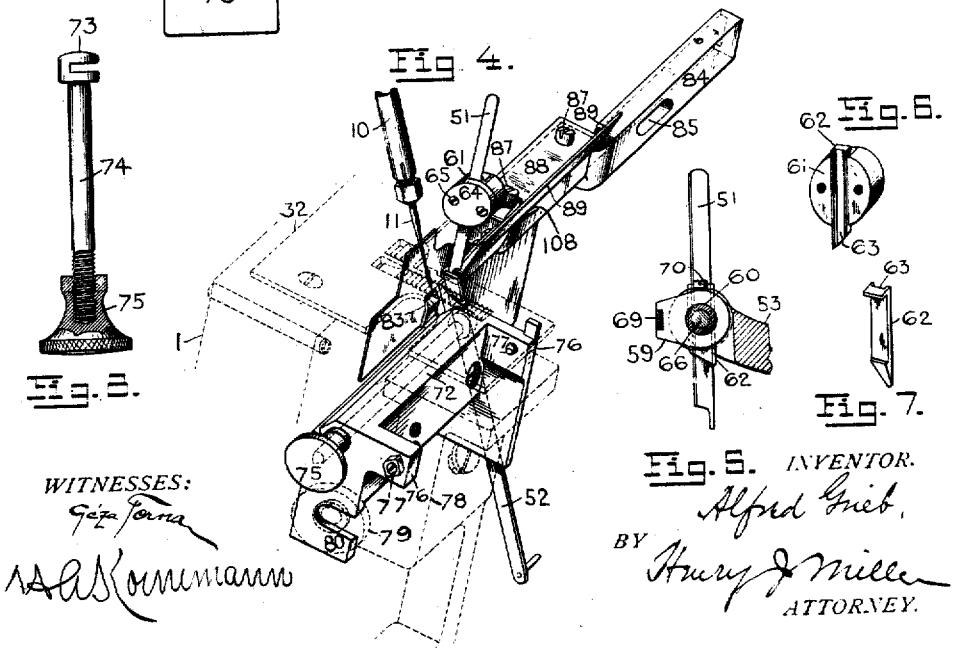
WITNESSES:
Géza Torna
A. Kornemann
INVENTOR.
Alfred Grieb,
BY Henry J. Miller
ATTORNEY.

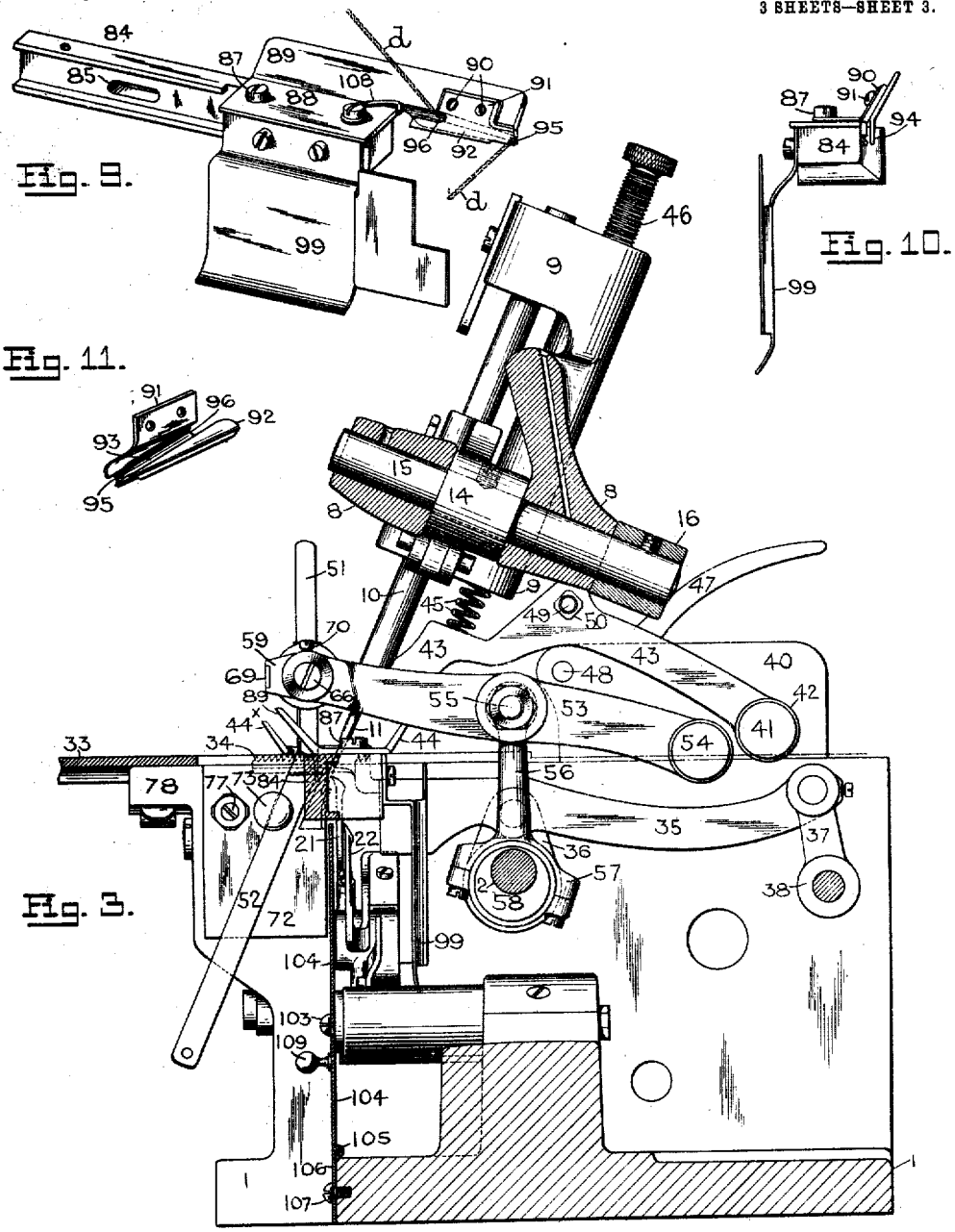

UNITED STATES PATENT OFFICE.

ALFRED GRIEB, OF ELIZABETH, NEW JERSEY, ASSIGNOR TO THE SINGER MANUFACTURING COMPANY, A CORPORATION OF NEW JERSEY.

TRIMMING MECHANISM FOR SEWING-MACHINES.

933,033.  Specification of Letters Patent.  Patented Aug. 31, 1909.

Original application filed April 13, 1907, Serial No. 368,035. Divided and this application filed April 25, 1908.
Serial No. 429,165.

*To all whom it may concern:*

Be it known that I, ALFRED GRIEB, a citizen of the United States, residing at Elizabeth, in the county of Union and State of New Jersey, have invented certain new and useful Improvements in Trimming Mechanism for Sewing-Machines, of which the following is a specification, reference being had therein to the accompanying drawings.

This application is a division of my application Serial No. 368,035, filed April 13, 1907.

The present invention relates to an improvement in trimming mechanism, and particularly mechanism of this character designed especially for operation in conjunction with overseaming stitch-forming mechanism.

The invention has for its primary object to provide simple and effective carriers for the coöperating cutting implements and means for readily adjusting them for determining the cutting line.

It has for its further object the provision of a suitable shield acting in conjunction with the trimming members for deflecting the cuttings from the trimming point, and a cord-guide following the lateral adjustments of the trimming members and said shield and adapted to lay a cord along the cut edge of the material to be embraced by the overseam.

The invention consists in the several constructive features herein shown and described and pointed out in the appended claims.

In the accompanying drawings, Figure 1 is a front side elevation of an overseaming and trimming machine embodying the present improvements, with the balance wheel and the greater portion of the work-plate omitted and a part of the casing broken away to expose the operative parts behind the same. Fig. 2 is a plan of the machine with the greater portion of the work-plate omitted to expose the mechanism beneath the same. Fig. 3 is a sectional end elevation of the machine taken in a vertical plane passing through the axis of oscillation of the needle-actuating rock-lever. Fig. 4 is a perspective view representing the coöperating trimming members with their carriers and adjacent parts. Fig. 5 is an enlarged sectional elevation of a portion of the vibrating trimmer lever with the upper knife-carrier and knife secured therein. Fig. 6 is a perspective view of the upper knife-carrying block, and Fig. 7 a similar view upon a larger scale of the gib to which the upper knife-blade is fitted. Fig. 8 is a detached view, partly in section, of the lower knife clamping member. Fig. 9 is a perspective view of the trimmings deflecting shield with its carrying bar and connected parts. Fig. 10 a front end view of the same, and Fig. 11 is a perspective view representing the inner side of the cord guiding member.

The machine is constructed with the base 1 having journaled in suitable standards the longitudinally extending main-shaft 2 shown supported at its rearward end by a bushing 3 and provided adjacent thereto with a needle actuating ball-crank 4. The top of the base 1 is provided with a seat to which is fitted and secured by means of screws 5 the foot 6 of the bracket-arm 7 provided with lateral bearing bosses 8 and with a head 9 in which is fitted the reciprocating needle-bar 10 carrying the eye-pointed needle 11. The needle-bar has fixed thereon the collar 12 having a lateral lug connected by means of the link 13 with the forward end of the rock-lever 14 mounted upon the fulcrum-pin 15 journaled in the bearing bosses 8 and having a rearwardly extending crank-arm 16. The crank-arm 16 carries a ball 17 embraced by a strap 18 at the upper end of the pitman 19 having at its lower end a strap 20 embracing the ball-crank 4 upon the main-shaft.

As herein represented, the machine is provided with a primary thread-carrying looper 21 and a secondary thread-carrying looper 22. The primary thread-carrying looper is mounted upon a carrier 23 fulcrumed upon the machine frame at 24, and the secondary looper is mounted upon a carrier 25 fulcrumed upon the machine frame at 26 and provided with a crank arm having a ball 27 embraced by a strap at one end of a pitman 28 whose other end carries a strap embracing a crank member 29 upon the main-shaft. The secondary looper carrier 25 has a rearwardly extending arm 30 connected by means of a pitman 31 with the shank of the primary looper-carrier 23, whereby the actuations of the secondary looper 22 through the connections 25, 27, 28 and 29 with the main-shaft are transmitted through the crank-arm 30, pitman 31 and carrier 23 to the primary looper 21.

The needle operates through the usual aperture in the throat-plate 32, forming a continuation of the work-plate 33, in coöperation with the primary looper, which enters its thread loops beneath the throat-plate, and the secondary looper which enters the primary looper loops and presents its own loops to the needle above the throat-plate.

As herein represented, the feeding mechanism comprises a feed-dog 34 mounted upon the feed-bar 35 provided with the link 36 embracing the usual feed lifting eccentric upon the main-shaft and having its rear end pivotally connected with the upright arms 37 carried by the feed-actuating rocking sleeve 38 operatively connected with the feed-actuating eccentric 39 upon the main-shaft.

The frame of the machine is provided with an upright bearing plate 40 carrying a lateral fulcrum-stud 41 embraced by the boss 42 of the presser-bar 43 carrying at its forward end the presser-foot 44 whose sole portion is normally pressed upon the throat-plate 32 by means of the pressure spring 45 interposed between a shoulder of the presser-bar and the end of an adjusting screw 46 entering a socket in the head of the bracket-arm, in a well-known manner.

The usual lifting cam-lever 47 is pivotally mounted upon the bearing plate 40 by means of the pin 48 and is adapted to engage the head of the screw-stud 49 carried by the presser-bar and provided with a lock nut 50.

The trimming mechanism comprises an upper reciprocating knife 51 and a lower stationary knife 52. The knife 51 is carried at the forward end of a vibrating lever 53 which is pivoted at the opposite end and securely held against lateral movement by means of the headed fulcrum-pin 54 mounted upon the bearing plate 40, and is pivotally connected intermediate its ends by a bolt 55 with the upper end of an eccentric rod 56 whose lower end is provided with a strap 57 embracing the trimmer actuating eccentric 58 upon the main-shaft. The forward end of the trimmer-bar 53 is forked to form a pair of spaced bearing members 59 to which is fitted a tubular knife-carrying bar on shaft 60 having at one end a head 61 provided with a diametrical channel in which is removably fitted a gib 62 having a longitudinal groove or channel 63 to which the knife-blade 51 is fitted. The channel in the head 61 is closed by means of a cap-piece 64 secured thereto by screws 65, and the point of a long clamping screw 66 entering the tubular shaft 60, by engaging the back of the gib 62, serves to clamp the same with the blade 51 in position within the head 61.

The knife-bar 60 is provided intermediate its bearings with a collar 67 having a bifurcated lateral lug 68 embracing a guide-rod 69 secured to and extending between the bearing members 59, such collar being adjustably secured upon the knife-bar by means of a set-screw 70, and a spring 71 is interposed between the collar 67 and one of the bearing members 59, whereby the upper knife 51 is pressed normally in contact with the lower knife 52. As will be observed, by loosening the set-screw 70, the knife-bar 60 may be turned in either direction to adjust the upper guide-bar 51 edgewise either forwardly or backwardly in the line of feed. By this means, the upper knife may be adjusted as closely as possible to the path of reciprocation of the needle, its path of movement being accurately positioned to accommodate different sizes of cord issuing from the cord-guide, which will be described later.

The lower knife-blade 52 is shown fitted to an inclined channel in a carrier-block 72 and clamped thereon by engagement therewith of the laterally notched head 73 of the pin or plug 74 passing through such block and having upon its threaded opposite end portion a milled clamping nut 75 by which the head 73 is drawn into operative engagement with the blade 52 entering its notch. The carrier-block 72 is mounted in suitable guide-ways of the frame, and is provided with lugs 76 having adjustable stop-screws 77 whose points are adapted to bear alternately upon a laterally projecting portion 78 of the main frame to limit the movement of such block and knife carried thereby transversely of the direction of feed. The adjustment of this knife-carrying block is effected by means of a screw 79 tapped into the member 78 of the machine frame and having a swivel connection with a slotted lug 80 of the block 72, and it may be securely clamped in any position of adjustment by means of the fastening screw 81 passing through a slot 82 in the member 78 of the machine frame and entering the block 72.

As will be readily understood, the shifting of the working position of the stationary knife 52 produces a corresponding lateral movement of the reciprocating knife 51 which follows the same under the yielding action of the spring 71. The carrier-block is provided with a needle-guiding finger 83 having an upper edge slightly inclined to the needle-path to insure against the deflection of the needle into the looper-path and the consequent breaking of the needle.

The side of the base 1 adjacent the foot 6 of the bracket-arm is provided with a longitudinal seat to which is fitted the shank 84 of a bracket member provided with a longitudinal slot 85 entered by the shank of a fastening screw 86 tapped into the base and adapted to secure such bracket-piece adjustably thereon. To the forward end of said bracket-piece is attached by means of screws 87 the foot 88 of an angular shield-plate having an upturned flange 89 inclined at an angle similar to that of the forward portion 44ˣ of the presser-foot, and having its end disposed close to the upper trimming knife 51 whereby it is adapted to strip the trimmings from the body of the fabric whose edge is to be provided with the overseam. By loosening the fastening screw 86, the shield-plate with the supporting bracket-piece 84 may be properly adjusted when the trimming knives are reset for different widths of overseam.

As disclosed in my pending application Ser. No. 321952, filed June 16, 1906, to the forward end portion of the flange 89 of the shield-plate is fastened by means of screws 90 the shank 91 of a cord-guiding member 92 which is provided upon its inner side with a longitudinal cord-receiving groove 93, the edge of the member 92 being spaced slightly from the depending lip 94 of the shield-plate to afford a longitudinal threading slit for the cord-guiding channel afforded by the grooved member 92 and the opposed lip 94, as indicated particularly in Figs. 9 and 10. The delivery end of the cord-guide has a transverse notch 95 so disposed as to deliver the cord adjacent to and slightly below the top of the throat-plate, and the member 92 is formed with a notch 96 through which the cord $d$ is adapted to be led from an eye of the thread-guiding plate 97 beneath the tension device 98, the cord being threaded through the longitudinal slit in the guiding channel 93 and directed by the latter to the lower edge of the material to which it is secured by the overseam.

The bracket-piece 84 carries a depending shield-plate 99 serving to shield the looper threads from the rotating parts beneath the work-plate, and the side of the base nearest the operator is inclosed by means of a removable plate 100 having key-hole slots 101 (Fig. 1) receiving the fastening screws 102 and 103, and a thin sheet metal door 104 forming a continuation thereof and having a hinge connection 105 along its lower edge to a plate 106 secured by screws 107 to the base-plate. The depending shield-plate 99 obviously serves as an oil-guard to protect the thread handling devices in front of the same, and the threads carried thereby, from oil which is likely to be thrown from the rapidly moving actuating mechanism connected with the main-shaft. The upper edge of the sheet-metal door is adapted to latch itself upon the wire fastening pin 108 secured to the bracket-piece 84 by means of one of the screws 87, as represented in Figs. 1, 4 and 9. The operative portion of the spring-wire fastening pin 108, which in practice lies slightly below and substantially parallel with the bottom of the shield-plate 88 89 extends slightly below the extreme upper edge of the swinging door 104, and its elasticity enables it when encountered by the upper edge of the door, to yield sufficiently to cause the door to snap in behind the same, where it is yieldingly held in position, in a manner well-known. A finger-piece 109 is shown applied to the cover-plate 100 for use in the removal of the latter for inspection of the looper mechanism; but in the threading of the loopers, it is in practice necessary only to open the door 104 for access to the secondary looper, the primary looper being accessible by bringing the same into its advance position above the throat-plate.

By the foregoing description, I have indicated the preferred construction and arrangement of the various parts of the machine, but it is to be understood that the same may be varied to a considerable degree without departure from the scope of the present invention.

Having thus set forth the nature of the invention what I claim herein is:—

1. A trimming mechanism comprising a vibrating lever mounted at one end upon and immovable endwise of a fixed fulcrum, a laterally yielding knife-carrier mounted upon the opposite end of said lever, an upper knife-blade mounted in and supported solely by said carrier, and a stationary lower knife-blade coöperating therewith.

2. A trimming mechanism comprising a vibrating lever mounted at one end upon and immovable endwise of a fixed fulcrum, a laterally movable knife-carrier mounted upon the opposite end of said lever, an upper knife-blade mounted in and supported solely by said carrier, a stationary lower knife-blade coöperating therewith, and means applied to said carrier for maintaining the upper blade yieldingly in contact with the lower blade.

3. A trimming mechanism comprising a vibrating lever mounted upon a fixed fulcrum at one end and forked at the opposite end to form spaced bearing members, an endwise movable knife-bar mounted in said bearing members, an upper knife-blade carried by said bar, a stationary lower knife-blade coöperating therewith, and means applied to said knife-bar for maintaining the upper blade yieldingly in contact with the lower knife-blade.

4. A trimming mechanism comprising a vibrating lever mounted upon a fixed fulcrum at one end and forked at the opposite end to form spaced bearing members, an endwise movable knife-bar mounted in said bearing members, an upper knife-blade carried by said bar, a stationary lower knife-blade coöperating therewith, a thrust-collar fixed upon said knife-bar intermediate its supporting bearings, and a spring interposed between said collar and one of said supporting bearings for applying a yielding endwise pressure upon said bar to maintain said upper knife in operative relation with the lower knife.

5. A trimming mechanism comprising a vibrating lever mounted upon a fixed fulcrum at one end and forked at the opposite end to form spaced bearing members, an endwise movable knife-bar mounted in said bearing members, an upper knife-blade carried by said bar, a stationary lower knife-blade coöperating therewith, a thrust-collar adjustably secured upon said knife-bar intermediate its supporting bearings, and provided with a forked lateral lug, a guide-rod secured to and disposed intermediate the supporting bearings of said knife-bar and embraced by the forked lug of its thrust-collar, and a spring interposed between said collar and one of said supporting bearings for applying a yielding endwise pressure upon said bar to maintain said upper knife in operative relation with the lower knife.

6. A trimming mechanism comprising a vibrating lever mounted upon a fixed fulcrum at one end, a tubular knife-supporting bar mounted transversely in the opposite end of said lever, a knife-carrying head upon said bar provided in its outer face with a transverse channel, a gib fitted removably to said channel and itself provided in one face with a channel, an upper knife-blade fitted to the channel in said gib, a cap secured to the outer face of the knife-carrying head, a clamping screw entering said tubular bar and engaging said gib and adapted to clamp said knife and gib in position in said head, and a stationary lower knife-blade coöperating with said upper knife-blade.

7. A trimming mechanism comprising a frame, a vibrating lever having at one end a fulcrum fixed upon said frame, an upper knife-blade carried by the opposite end of said lever and adapted to yield laterally thereon, a carrier-block mounted upon and fitted to a slide-way in said frame, a lower knife-blade carried by said block and extending upwardly into operative relation with the upper knife-blade, means for securing said lower knife-blade in position on said carrier-block, spaced stop members upon said carrier-block embracing a portion of the frame of the machine to limit the degree of adjustment of the carrier-block in both directions, and means for maintaining said carrier-block in position when adjusted.

8. A trimming mechanism comprising a frame, a vibrating lever having at one end a fulcrum fixed upon said frame, an upper knife-blade carried by the opposite end of said lever and adapted to yield laterally thereon, a carrier-block mounted upon and fitted to a slide-way in said frame, a lower knife-blade carried by said block and extending upwardly into operative relation with the upper knife-blade, means for securing said lower knife-blade in position on said carrier-block, spaced stop members upon said carrier-block embracing a portion of the frame of the machine to limit the degree of adjustment of the carrier-block in both directions, and an adjusting screw swiveled to said carrier-block and entering a fixed portion of said frame.

9. In an overseaming and trimming machine, the combination with the frame and overseam-stitch-forming, feeding and trimming mechanisms mounted therein, of a bracket-piece secured upon a fixed portion of said frame and adapted for adjustment toward and from said stitch-forming and trimming mechanisms, a deflecting shield mounted upon said bracket-piece and extended into close proximity to the trimming members for deflecting the trimmings from the body portion of the work, and a cord-guide secured to and carried by the operative end portion of said shield.

10. In an overseaming and trimming machine, the combination with the frame and overseam-stitch-forming, feeding and trimming mechanisms mounted therein, of a bracket-piece secured upon a fixed portion of said frame and adapted for adjustment toward and from said stitch-forming and trimming mechanisms a deflecting shield mounted upon said bracket-piece and extended into close proximity to the trimming members for deflecting the trimmings from the body portion of the work, and a cord-guiding member longitudinally grooved upon its inner side and secured to the operative end portion of said shield with its groove opposed to the latter to form a cord-guiding channel.

11. In an overseaming and trimming machine, the combination with the frame and overseam-stitch-forming, feeding and trimming mechanisms mounted therein, of a bracket-piece secured upon a fixed portion of said frame and adapted for adjustment toward and from said stitch-forming and trimming mechanisms, a deflecting shield mounted upon said bracket-piece and extended into close proximity to the trimming members for deflecting the trimmings from the body portion of the work, and a cord-guiding member longitudinally grooved upon its inner side and secured to the operative end portion of said shield with its grooved face opposed to the latter and spaced therefrom to form a cord-guiding channel open along one side for introduction of the cord.

12. In an overseaming and trimming machine, the combination with the frame, a main-shaft journalled therein, and overseam-stitch-forming, feeding and trimming mechanisms having operative connections with said main shaft, of a bracket-piece secured upon a fixed portion of said frame and adapted for adjustment toward and from said stitch-forming, feeding and trimming mechanisms, a deflecting shield mounted upon said bracket-piece and extended into close proximity to the trimming members for deflecting the trimmings from the body portion of the work, and an oil-guard plate secured to and depending from said bracket-piece intermediate the main-shaft and stitch-forming members adjacent thereto.

13. In a sewing machine, the combination with stitch-forming and feeding mechanisms, of a trimming mechanism comprising a reciprocating member, a knife-carrier mounted upon said member and adapted to yield transversely of the direction of feed, an upper knife-blade mounted in said carrier and adjustable parallel with the line of feed, and a stationary lower knife-blade coöperating with the upper knife-blade.

14. In a sewing machine, the combination with stitch-forming and feeding mechanisms, of a trimming mechanism comprising a reciprocating member, a knife-carrier, a bar mounted upon and transversely of said reciprocating member upon which the knife-carrier is fixed, an upper knife-blade mounted in said carrier, a stationary lower knife-blade coöperating therewith, means applied to said bar for pressing the upper knife-blade yieldingly in contact with the lower knife-blade, and means for providing circular adjustment for the knife-carrier bar to afford edgewise adjustment of the upper knife-blade relative to the lower knife-blade.

In testimony whereof, I have signed my name to this specification, in the presence of two subscribing witnesses.

ALFRED GRIEB.

Witnesses:
HENRY J. MILLER,
JOSEPH F. JAQUITH.